United States Patent
Deardurff et al.

(10) Patent No.: US 6,783,819 B2
(45) Date of Patent: Aug. 31, 2004

(54) CROWN COMPOUND MODIFIED SILICA COATINGS FOR INK-JET MEDIA

(75) Inventors: Larrie A. Deardurff, Corvallis, OR (US); James P. Shields, Philomath, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 62 days.

(21) Appl. No.: 10/120,949

(22) Filed: Apr. 10, 2002

(65) Prior Publication Data

US 2003/0198786 A1 Oct. 23, 2003

(51) Int. Cl.[7] .............................. B41M 5/40
(52) U.S. Cl. .................... 428/32.36; 428/32.21
(58) Field of Search .................. 428/32.21, 32.36, 428/32.26

(56) References Cited

U.S. PATENT DOCUMENTS

| | | | | |
|---|---|---|---|---|
| 4,943,375 A | * | 7/1990 | Bradshaw et al. | 210/674 |
| 4,946,557 A | | 8/1990 | Svending | 162/168.3 |
| 5,179,213 A | | 1/1993 | Bradshaw et al. | 549/3 |
| 5,264,275 A | | 11/1993 | Misuda et al. | 428/304.4 |
| 5,275,867 A | | 1/1994 | Misuda et al. | 428/195 |
| 5,368,833 A | | 11/1994 | Johansson et al. | 423/338 |
| 5,393,892 A | | 2/1995 | Krakowiak et al. | 549/214 |
| 5,463,178 A | | 10/1995 | Suzuki et al. | 428/216 |
| 5,547,760 A | | 8/1996 | Tarbet et al. | 428/471 |
| 5,643,414 A | | 7/1997 | Johansson et al. | 162/164.6 |
| 5,702,610 A | * | 12/1997 | Hagen et al. | 210/670 |
| 5,702,804 A | * | 12/1997 | Malhotra | 428/32.13 |
| 5,707,493 A | | 1/1998 | Saastamoinen | 162/164.1 |
| 5,858,280 A | | 1/1999 | Zhang et al. | 252/315.2 |
| 5,965,244 A | | 10/1999 | Tang et al. | 428/195 |
| 6,103,380 A | | 8/2000 | Devonport | 428/403 |
| 6,110,601 A | | 8/2000 | Shaw-Klein et al. | 428/522 |
| 6,126,280 A | | 10/2000 | Hashimoto et al. | 347/101 |
| 6,183,844 B1 | | 2/2001 | Li | 428/212 |
| 6,265,483 B1 | | 7/2001 | Guilard et al. | 525/69 |
| 6,337,358 B1 | | 1/2002 | Whitehouse et al. | 523/200 |
| 6,350,519 B1 | | 2/2002 | Devonport | 428/403 |
| 2002/0144626 A1 | * | 10/2002 | Schut | 106/31.58 |

* cited by examiner

*Primary Examiner*—B. Shewareged

(57) ABSTRACT

The present invention is drawn to systems and coated substrates for ink-jet ink printing. The coated media substrate can comprise a substrate, having coated thereon, a porous coating, wherein the porous coating comprises silica having crown compounds covalently attached thereto. The system utilizes a coated media substrate wherein the coating is functionalized with crown compounds, and further provides an ink-jet ink composition that has an affinity for the crown compounds.

26 Claims, No Drawings

CROWN COMPOUND MODIFIED SILICA COATINGS FOR INK-JET MEDIA

FIELD OF THE INVENTION

The present invention is drawn to crown compound modified silica coatings for ink-jet media. The present invention is also drawn to ink-jet ink and coated media systems that provide good image permanence over time.

BACKGROUND OF THE INVENTION

In recent years, computer printer technology has evolved to a point where high resolution images can be transferred on to various types of media, including paper. One particular type of printing involves the placement of small drops of a fluid ink onto media surfaces in response to a digital signal. Typically, the fluid ink is placed or jetted onto the surface without physical contact between the printing device and the surface. Within this general technique, the specific method that the ink-jet ink is deposited onto the printing surface varies from system to system, and can include continuous ink deposit or drop-on-demand ink deposit.

With regard to continuous printing systems, inks used are typically based on solvents such as methyl ethyl ketone and ethanol. Essentially, continuous printing systems function as a stream of ink droplets that are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink-jet inks are typically based upon water and glycols. Essentially, with these systems, ink droplets are propelled from a nozzle by heat or by a pressure wave such that all of the ink droplets ejected are used to form the printed image.

There are several reasons that make ink-jet printing a popular way of recording images on various media surfaces, particularly paper. Some of these reasons include low printer noise, capability of high-speed recording, and multi-color recording. Additionally, these advantages can be obtained at a relatively low cost to consumers. However, though there have been great improvements in ink-jet printing, accompanying these improvements are increased consumer demands such as higher speeds, higher resolution, full color image formation, increased image durability, etc. As new ink-jet inks are developed, there have been several traditional characteristics to consider when evaluating the ink in conjunction with printing media. Such characteristics include edge acuity and optical density of the image on the surface, dry time of the ink on the substrate, adhesion to the substrate, lack of deviation of ink droplets, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component to address one of the above attributes prevents another being met. Thus, most commercial inks for use in ink-jet printers represent a compromise, in an attempt to achieve adequate performance in all of the above listed attributes.

Ink-jet inks are either dye- or pigment-based. Dye-based ink-jet inks generally, but not always, use water-soluble colorants. As a result, such dye-based inks are usually not always water fast. Prints made from these inks tend to undergo color change over time, or fading, when exposed to ambient light and air. The media surface can play a key role in the fade properties and wet fastness of an image in that for a given ink, the degree of fade and wet fastness can be highly dependent on the chemistry of the media surface. Therefore, for optimum performance, many ink-jet inks often require that an appropriate media be selected in accordance with the application, thus, reducing the choice of media. In the case of pigmented inks, it is the dispersed colorant particles that produce color. Often the line quality of prints produced by pigment-based inks is superior to that of dye-based inks. When a printed image is made with pigmented inks, solid colorant particles adhere to the surface of the substrate. Once the ink vehicle evaporates, the particles will generally not go back into solution, and are therefore more water fast. In addition, pigmented inks are often much more fade resistant than dye-based inks. Though pigmented inks, in some areas, exhibit superior performance, dyes in general produce inherently more color saturated and more reliable inks. Thus, dye-based inks have been more often used in applications where fade resistance is not primarily important.

In order for the ink-jet industry to effectively compete with silver halide photography, it is important that ink-jet prints must improve their image fade resistance. In other words, enhanced permanence of images has become important to the long-term success of photo-quality ink-jet ink technologies. According to accelerated tests and "industry standard" failure criteria, photographs have typically been known to last about 13 to 22 years under fluorescent light exposure. There are now even systems with published values of 19 to 30 years. The best dye based ink-jet printers produce prints that last for much less time under similar conditions.

Two broad categories of photographic ink-jet media are currently available: polymer and porous coating based media. It is the polymer based type that produce the best known images, e.g. longest lasting, mentioned above. However, this category of media is generally inferior in dry time and wet fastness relative to porous coating-based media. On the other hand, image fade resistance and humid fastness of the porous coating-based media is generally lower than that of its polymer-based media counterpart. Therefore, there is a great desire to improve the image permanence of ink jet ink images on porous coating based media.

SUMMARY OF THE INVENTION

In accordance with the compositions and coated substrates of the present invention, the use of a chemically modified silica coating can provide certain advantages related to image permanence over the prior art. For example, the use of a crown compound chemically attached to silica as a coating on paper or other substrate can provide altered image permanence characteristics. More specifically, as crown compounds are known to interact with certain ions, the presence of the crown compounds can alter the way ion-containing dyes interact with media coated as described herein.

With this in mind, a coated substrate for ink-jet ink printing can comprise a substrate having a porous coating coated thereon. In one embodiment, the porous coating can be silica covalently modified by a crown compound through a reactive group (and optionally, a spacer group). The crown compound can further be substantially homogenously distributed on the silica. In one embodiment, the crown compound can be a crown ether.

In another embodiment, a system for producing permanent ink-jet ink images can comprise a substrate, having coated thereon a porous coating, said porous coating comprising silica covalently attached to a crown compound through a reactive group; and an ink-jet ink comprising a composition configured for chemically interacting with the crown compound upon printing the ink-jet ink onto the porous coating.

Crown compound modified silica gel can be used to bind cationic dyes directly, or to bind anionic dyes indirectly, such as by interacting with the counter ion associated with the dye. An advantage that can be realized by an embodiment of the present invention is that the orientation of a dye relative to crown compound modified silica media can be different than that obtained with standard silica modified media. This change in the surface orientation can improve the stability of the dye, and improve water fastness and humid fastness properties. For example, the use of crown ether modified silica media can enhance the specificity of the surface absorption of dyes and other charged species due to the presence of a crown ether/cationic interaction, e.g., crown ether/dye or counter ion. These interactions can help hold the dye in place and thereby increase its water and humid fastness. In addition, the manner in which the dye is held can impact the stability of the dye or other cationic species with respect to light and atmospheric pollutants. Specific crown ethers can also be chosen for use that are tailored for specific cations. Thus, if a cationic dye is used that has $(CH_3)_3CNH_3^+$ groups present, a crown ether can be chosen that will preferentially bind $(CH_3)_3CNH_3^+$ over a $Na^+$ ion that may otherwise be present in the ink-jet ink composition. Thus, $Na^+$ ions from other ink components will not substantially interfere with the preferred mode of action. In addition, typical sulfonic acid dyes can bind with the crown compound modified silica surface, with the $M^+$ of the $SO_3M$ group of the dye interacting with the surface of the coated media.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

As used in this specification and the appended claims, the singular forms "a," "an," and "the" include plural referents unless the content clearly dictates otherwise.

"Image permanence" refers to characteristics of an ink-jet printed image that relate to the ability of the image to last over a period of time. Characteristics of image permanence include image fade, water fastness, humid fastness, light fastness, smudge resistance, air pollution induced fading, scratch and rub resistance, and inhibition of microbial growth.

"Light fast" or "color fast" refers to the quality of a printed image. Images printed on the ink-jet ink media of the present invention tend to retain their color density and detail (as well as show significantly less fading) when exposed to light and/or air (air pollution resistance) as compared to a standard printed image.

"Humid fast" refers to the ability of a printed image to retain is image quality in damp conditions.

"Water fast" refers to resistance of movement of a colorant of an image when in contact with water.

"Media substrate" or "substrate" includes any substrate that can be used in the ink-jet printing arts including papers, overhead projector plastics, coated papers, fabric, art paper (e.g. water color paper), and the like.

"Crown ether" includes ring structures which contain multiple ether units. Crown ethers are commonly named using the notation "x-crown-y" where x is the number of atoms forming the ring and y is the number of oxygen atoms. With one type of crown ether, y can be from 4 to 10, and x can be 3y. In accordance with this principle, crown ethers that can be used include those comprising the structure of Formula 1 below:

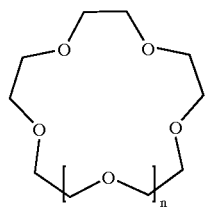

Formula 1 where n is from 0 to 6. Crown ethers as defined in Formula 1 above can also include compositions that have functional or appendage groups attached to one or more carbon atom of the macrocycle. Examples are provided below:

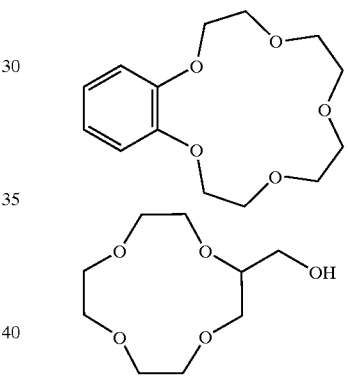

Other crown ethers can also be used such as those having three carbon atoms between any two oxygen atoms. Using the x-crown-y formula, y can be from 4 to 10, and x can be 3y+(0, 1, 2, . . . , up to y). Examples of crown ethers in accordance with this more inclusive definition can be used in accordance with the present invention, and are shown below:

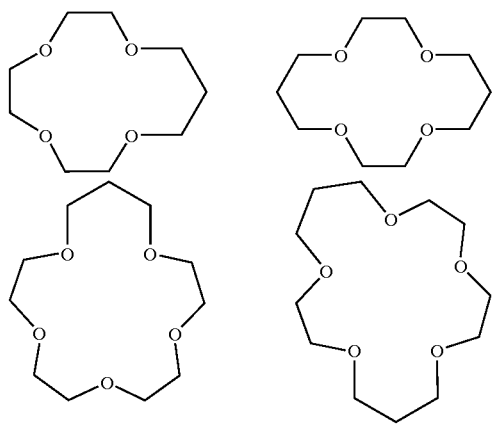

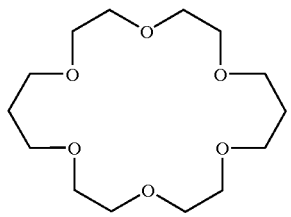

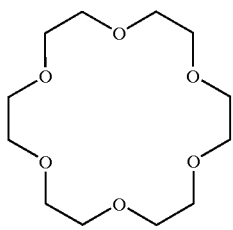

"Crown compounds" include crown ethers and other crown macrocyclic polydentate compounds, usually uncharged, in which three or more coordinating ring atoms, e.g., oxygen, sulfur, or nitrogen, are or may become suitably close for easy formation of chelate complexes with metal ions or other cationic species. Preferred crown compounds are crown ethers. However, other crown compounds can be used, depending on the dye or other cationic compound present in the ink-jet ink formulation used in accordance with embodiments of the present invention. Crown compounds are also known as coronands and the chelate or complex between a cationic compound and a crown compound are known as coronates. One formula for crown compounds that can be used in accordance with the present invention include those comprising that shown in Formula 2 below:

Formula 2

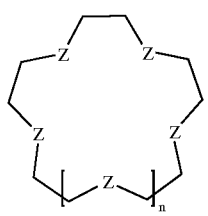

where n is from 0 to 6, and each Z is independently O, S, or N. In accordance with Formula 2, functionalities or appendage groups can be present as well, similar to those shown in connection with crown ethers, and as would be ascertainable by one skilled in the art. Further, other crown compounds can also include those having three carbon atoms between any two Z constituent atoms as shown above, or those that include heterocyclic rings attached to the macrocycle. Examples of such crown compounds include the following:

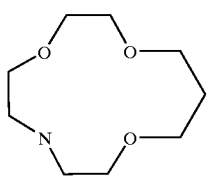 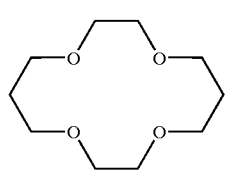

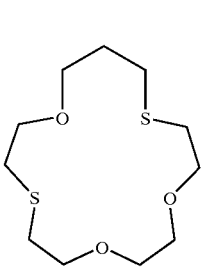 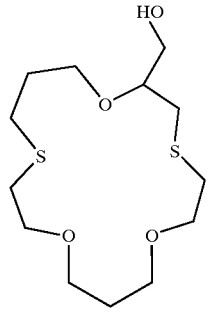

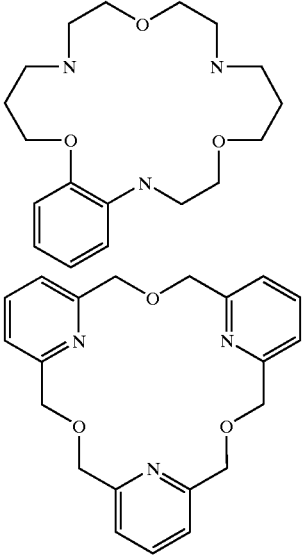

The above are merely exemplary, and are not intended to be limiting with respect to the crown compounds that can be used in accordance with the present invention.

The term "lower" when referring to organic compounds or groups (when not otherwise specified) can contain from 1 to 3 carbons. For example, lower alkoxy can include methoxy, ethoxy, or propoxy groups. Additionally, lower alkyl can include methyl, ethyl, or propyl groups.

"Homogenously distributed" or "evenly distributed" refers to a substantially uniform distribution of crown compounds via chemical attachment to a silica surface.

"Reactive group" is any group that can be used to attach a crown compound to silica. The reactive group can be attached directly to the crown compound at any functional location, or can be attached to the crown compound through a spacer group. In one embodiment, the reactive group can be halo silane or lower alkoxy silane, as these reactive groups are functional for attachment to silica.

"Spacer group" can be any organic chain that can be used as a spacer to interconnect or link a crown compound to a reactive group. For example, a straight chain alkyl moiety having from 1 to 10 carbons can be used. Numerous other spacer groups can be used as well, such as —$(CH_2)_b$—, —$(CH_2)_b NH(C)O$—, —$(CH_2)_a O(CH_2)_b$—, or —$(CH_2)_b NH$—, where a is from 0 to 3 carbons, and b is from 1 to 10 carbons. The former are exemplary only, as any functional spacer group can be used, provided it is functional in accordance with an embodiment of the present invention.

One advantage the present invention is the ability to provide crown compounds as part of a silica media coating wherein the crown compounds are at or near the surface of the silica. By the use of such compositions, the crown compounds are placed in close proximity to a dye being used as part of an ink-jet ink to print an image. Additionally, because the crown compounds are at or near the surface of the silica, a smaller amount of the crown compounds is necessary for use to provide a desired result.

In a first embodiment of the present invention, a coated substrate for ink-jet ink printing can comprise a media substrate having coated thereon a porous coating, wherein the porous coating can comprise silica covalently attached to crown compounds through reactive groups, and optionally, wherein the crown compounds can be substantially homogenously distributed throughout the silica. The most commonly used substrates include paper and photographic media, though other materials can be used as the substrate, e.g., fabrics, metals, plastics, and the like. With respect to the reactive group, any reactive group can be used that is functional for attaching the crown compound to silica, including halo silanes and alkoxy silanes.

As mentioned, a crown compound can be used to chemically modify silica, forming a chemically modified silica porous coating material. The crown compound in particular can be selected for its reactive properties when in the presence of a predetermined dye. Thus, when an ink containing a reactive dye is printed on the coating, the crown compound can interact with the dye on the coating surface, thus, enhancing the permanence of the image. In a more detailed embodiment, the crown compound can be a crown ether. The following is given by way of example, illustrating possible crown compounds, various reactive groups, and the optional spacer group that can be used in connection with the present invention, as illustrated in Formula 3 below:

Silica-A-B-Crown     Formula 3 where A is a reactive group, B is a spacer group, and Crown is a crown compound. Any reactive group can be used in accordance with the present invention, including those having the formula $SiR_3$, where each R can independently be halo, lower alkoxy, or a lower alkyl group (such as methyl, ethyl, propyl, or iso-propyl), with the proviso that at least one R must be reactive with silica, e.g., halo or lower alkoxy. Additionally, if a spacer group is present, any appropriate spacer group can be used to tether the crown compound to the reactive group (and ultimately, the silica surface). Examples of appropriate spacer groups can include: —$(CH_2)_b$—, —$(CH_2)_bNH(C)O$—, —$(CH_2)_bO(CH_2)_a$—, or —$(CH_2)_bNH$—, where a is from 0 to 3 carbons, and b is from 1 to 10 carbons. A specific group of examples of compositions that can be used is exemplified below:

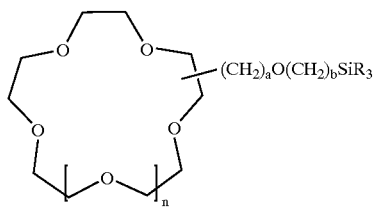

In the above example, each R can independently be halo, lower alkoxy, or a lower alkyl group (such as methyl, ethyl, propyl, or iso-propyl), with the proviso that at least one R must be reactive with silica, e.g., halo or lower alkoxy, and n is from 0 to 6. Thus, a halo silane reactive group and/or a lower alkyl reactive group can be present, as represented by —$SiR_3$. The silica component is not shown, but is reactive with one or more of the R groups. A spacer group is shown having the formula —$(CH_2)_aO(CH_2)_b$—, wherein a can be from 0 to 3, and b can be from 1 to 10. Though the reactive group/lower alkyl group and spacer group is shown attached to a certain portion of the crown compound, this is not intended to be limiting. All that is required is that the reactive group maintain its functionality for attaching to silica, and that the crown compound maintain its functionality for interacting with desired dyes, or other ink-jet ink components. In other words, any means or point of attachment (though a spacer group or without a spacer group) between the crown compound and the reactive group can be used, provided the aforementioned functionalities can be maintained. Further, though a specific type of spacer group is shown, other spacer groups can be used, as would be known by one skilled in the art after reading the present disclosure.

The reason that there must be at least one reactive group is so the crown ether can be covalently attached to the silica (not shown) to form the coating material. Though a crown ether functionalized with a reactive group attached through a silane is shown, other crown ethers having other reactive groups can also be attached to silica and coated onto an ink-jet ink media substrate. For example, crown compounds that contain sulfur (S) or nitrogen (N) in place of one or more oxygen groups of the crown ether can be used. Additionally, crown compounds having 2 or 3 carbon atom chains interlinked by O, S, or N can be present as well.

There are several advantages to providing a coating having crown compounds covalently attached to silica. In the prior art, organic modifiers have been incorporated in media coatings such that the coatings interact with dyes of the image. However, as these modifiers are merely admixed within the coating, a non-homogenous distribution of the additive on the porous coating is generally realized. With respect to the present invention, if a dye is used, the crown compounds covalently bonded to the silica in a manner wherein the crown compounds are homogenously distributed on the silica surface, providing a coating that promotes good image permanence when contacted with a dye. Additionally, the crown compound modified silica can alter the manner in which a dye interacts with the media, also improving image permanence. Still further, with the present invention, the use of image fade additives in ink-jet inks, which tends to increase the complexity and reduce the reliability of many inks, can be avoided.

Silica can be modified with crown compounds according to the following general method. The silica is dried in a vacuum at an elevated temperature to remove adsorbed moisture and allowed to cool to room temperature. The solvent in which the reaction is to be carried out is also dried with an appropriate drying agent. Common solvents that can be used included toluene, dichloromethane, isopropanol, and/or methanol. The dried silica is taken into the dry solvent (or it may be dispersed in the solvent by sonication). The amount of solvent used should be selected such that the crown containing reagent concentration (when added) does not generally exceed about 10%. The vessel containing the silica and solvent mixture may be flushed with dry nitrogen, and then the reagent, e.g., lower alkoxy or halo silane functionalized with a crown compound, is introduced into the reaction vessel. The amount of reagent added depends on the surface area, and the surface silanol concentration of the silica and the molecular weight of the reagent. When selecting the reaction conditions, one should consider its reactivity. For example, alkoxy silanes are less reactive than halo silanes. Thus, reaction times and temperatures are adjusted after considering the reagent used. Typically, about six hours or more of refluxing under dry nitrogen is required. If carried out at room temperature rather than at elevated temperatures, longer reactions times may be necessary. After the reaction is completed, the product is filtered and washed with excess solvent and dried. This general procedure can be carried out to prepare the coating material for use with the present invention. This reaction may also be carried out without the use of excess reagent, thus eliminating the need to remove excess reagent by washing. Methanol is a preferred solvent, hence, small amounts of it may remain in the product since it is miscible with water, which is used in the subsequent coating step.

The application of the silica modified coating composition can be conducted by using any of a number of methods known in the art, including the use of an air knife coater, a blade coater, a gate roll coater, a doctor blade, a Meyer rod, a roller, a reverse roller, a gravure coater, a brush applicator, a sprayer, and the like. Further, drying of the coating may be effected by conventional means such as hot air convection, microwave, infrared heating, or open air drying.

Once a paper or other substrate is coated in accordance with principles of the present invention, dyes can be selected for use as part of a system or method that have acceptable binding properties to the silica bound crown compound present as the coating. Alternatively, a coating composition can be selected for use after identifying an ink-jet ink or dye for use. The following table presents exemplary crown compounds that can be used relative to common counterions present in ink-jet ink dyes.

TABLE 1

Log K of binding constants for crown compounds and common counterions present in ink-jet ink compositions

|  | $Na^+$ | $K^+$ | $Cs^+$ | $(CH_3)_3CNH_3^+$ |
|---|---|---|---|---|
| 18-Crown-6 | 4.32 | 6.1 | 4.62 | 5.85 |
| Dibenzo18-Crown-6 | 4.36 | 5.0 | 3.55 |  |
| Dibenzo21-Crown-7 | 2.4 | 4.3 | 4.2 |  |
| Cyclohexyl-15-Crown-5 |  | 3.58 |  |  |
| Benzo-18-Crown-6 |  |  |  | 5.0 |
|  |  |  |  | 5.82 |
|  |  |  |  | 8.21 |
|  |  |  |  | 2.05 |
|  |  |  |  | 1.23 |

The above binding constant data can be found in *Studies in Organic Chemistry* 12, Crown Compounds, M. Hiraoka, Elsevier, 1982.

Though all of the compositions recited in Table 1 above are functional for binding the ions cited, the higher the value, the stronger the binding. Therefore, as an example, if the objective is to bind one particular ion of a dye over another ion that may be present in an ink vehicle composition of the ink-jet ink being used, a crown compound should be selected that has a higher binding constant as to the dye counter ion than the ink-vehicle counter ion. Additionally, in selecting crown compounds and dyes to be used in a common system, in one embodiment, a counter ion can be selected for use that has an affinity for the crown compound that is greater than 1 as defined by Log K of the binding constant. In a more preferred embodiment, the counter ion can have an affinity for the crown compound that is greater than 4 as defined by Log K of the binding constant. Still further, in one embodiment, the crown compound can have an affinity for a cationic dye itself.

In accordance with an embodiment of the present invention, multiple ink-jet inks can be configured for chemically interacting with the crown compound. More specifically, with respect to the dyes that can be selected for use, an ink-set can be formulated that comprises multiple dyes wherein all of the dyes have a common counter ion. For example, $Na^+$ counter ions are common in many dyes. Thus, an ink set can be assembled that comprises black ink, cyan ink, magenta ink, and yellow ink, each containing dyes having a $Na^+$ counter ion present. By selecting a crown compound for use that preferentially binds $Na^+$ ions, good image permanence can be achieved with respect to all of the ink-jet inks used. An example of such an ink set can include three or more ink-jet inks which can individually include AR52 dye, DB199 dye, and DY132, each having a $Na^+$ counter ion present associated with each dye. A black ink-jet ink containing a $Na^+$ RB-31 (reactive black 31) dye can be used if a black ink is present. Likewise, a similar ink-set can be configured using a different common dye counter ion in each of the inks of the ink set, e.g., $(CH_3)_3CNH_3^+$, $Li^+$, $K^+$, $Cs^+$, etc. Such an ink set could be optimized for image permanence by selecting a crown compound for use that interacts well with the dye salt selected.

In another embodiment, if the desire is to vary the binding capacity of certain dyes over other, then dyes can be selected that have different cationic moieties present. For example, if a first dye having a $NH_3^+$ group and a second dye having a $N(CH_3)_3^+$ are present in different inks of a common ink set, a correctly sized crown ether can be chosen that would selective bind the first dye over the second dye, or vice versa.

EXAMPLES

The following examples illustrate various aspects of coatings for porous ink-jet ink media substrates. The following examples should not be considered as limitations of the invention, but should merely teach how to make the best coatings, reflecting the present invention.

Example 1
Attachment of Crown Compounds to Reactive Groups through Spacer Groups As illustrated by reactions A, B and C below, the following can be carried out to attach crown compounds to a reactive group through a spacer group (forming a silane reagent). Though the present example illustrates the modification of three specific crown ethers, other crown compounds can also be modified likewise, or by other methods known in the art.

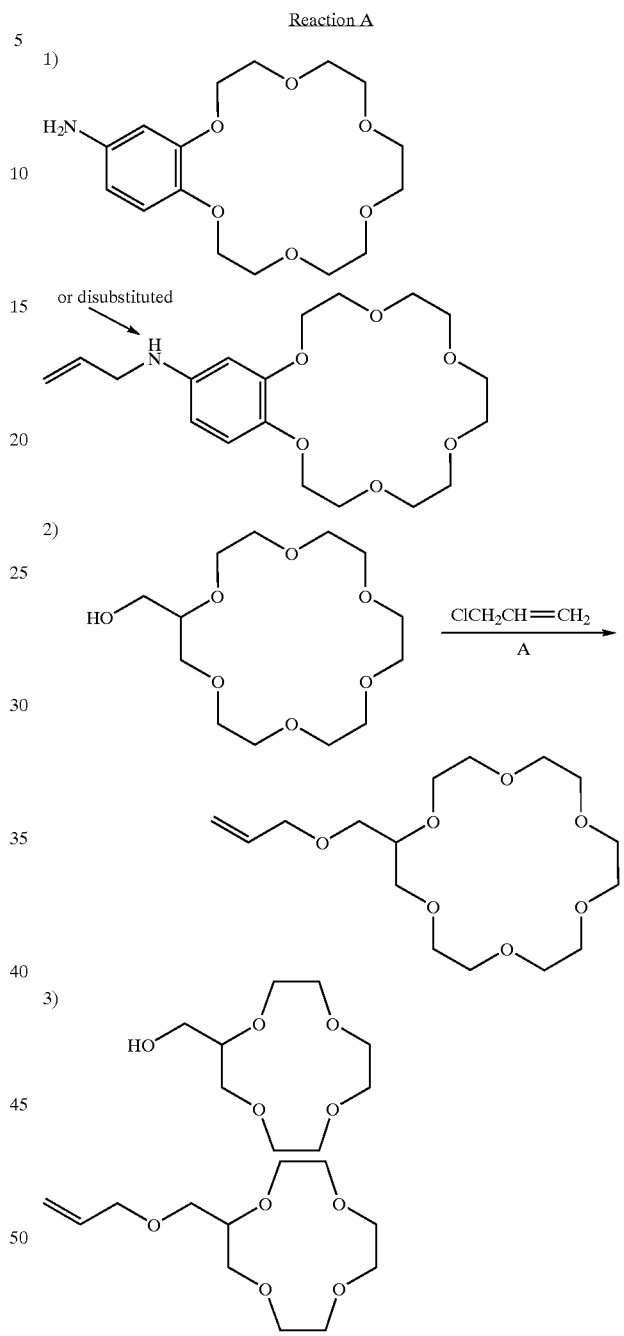

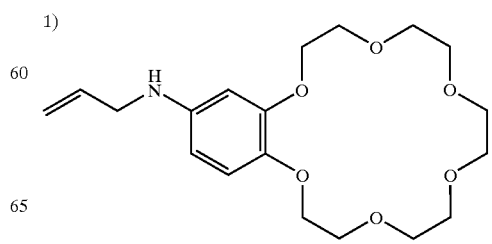

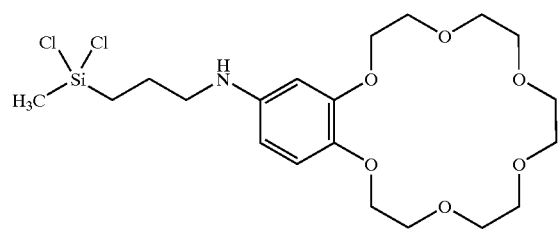

2)

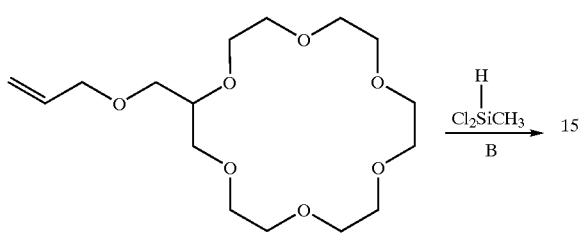

$\xrightarrow[B]{\underset{Cl_2SiCH_3}{H}}$

3)

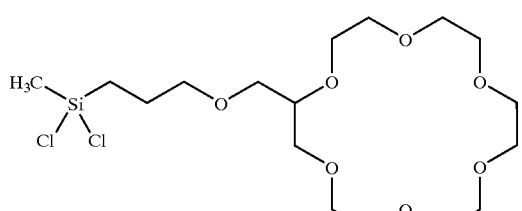

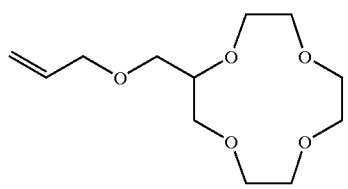

Reaction C

1)

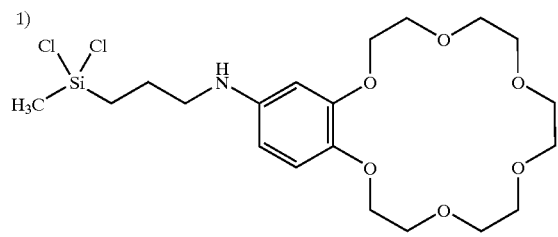

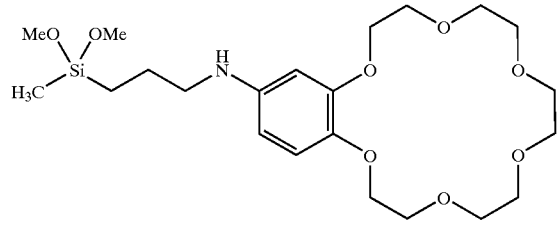

2)

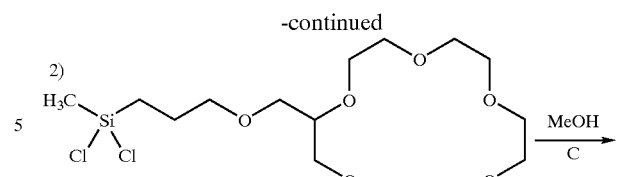

$\xrightarrow{\underset{C}{MeOH}}$

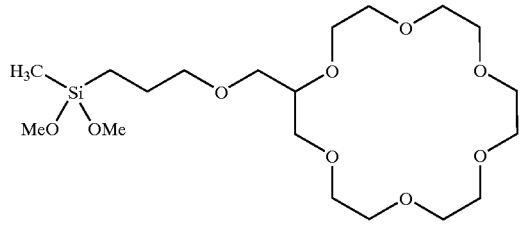

3)

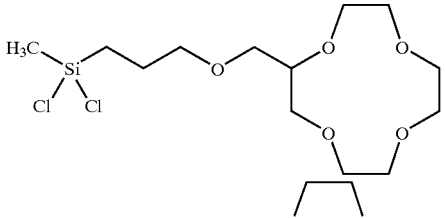

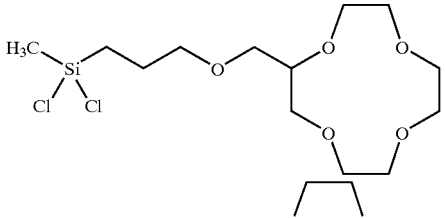

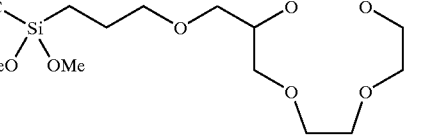

Example 2
Preparation of 18-Crown-6 Modified Silica

About 40 grams of silica to be modified is dried overnight in a vacuum at about 110° C. to remove adsorbed moisture. The dried silica is then allowed to cool to room temperature. About 500 ml of methanol is also dried over calcium sulfate. The dried silica is then taken into the dried methanol and the silica is dispersed in methanol by sonication. Dry nitrogen is passed in to the reaction vessel at a slow rate to eliminate ambient moisture. The reagent, as shown below (which includes the 18-crown-6 ligand, the spacer group, and the reactive group), is injected in to the reaction vessel, and the reaction mixture is stirred at ambient temperature, or can be refluxed.

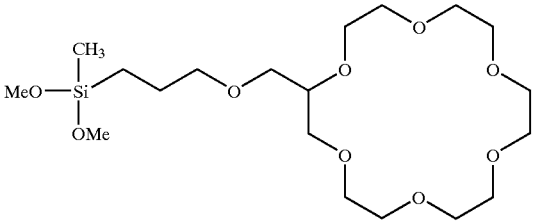

The amount of reagent used in the reaction is dependent on the surface area, and the surface silanol concentration of the silica and the functionality of the reagent. The amount of reagent (in grams) needed for complete reaction for the bifunctional silane shown above is given by 40 g×S m$^2$/g×M g/mol×8 micro mol/m$^2$×10$^{-6}$/2, where, S=surface area, M=Molecular weight of the reagent, and the surface silanol concentration is 8 micro mol/m². The product is filtered or centrifuged, and if excess reagent is used, it is removed by washing with dry methanol and dried. A coating composition (reagent bound to the silica surface) can be depicted as follows:

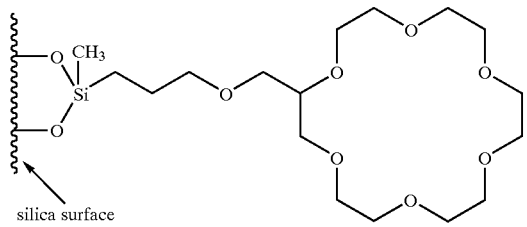

silica surface

Example 3

Compositions prepared according to Example 2 can be coated on paper or photographic substrates by a hand draw down method, or another functional method. Coated papers prepared according to the present example exhibit improved image permanence compared to papers having only silica coated thereon. Substrates coated according to the present example are effective for binding dyes having $(CH_3)_3CNH_3^+$, $Li^+$, $K^+$, and $Cs^+$ counter ions, as well as many cationic dyes such as Basic Red 1, Basic Blue 66, and Basic Yellow 1.

Example 4

A black ink-jet ink containing a $Na^+$ salt PRB31 (pacified reactive black 31), a magenta ink-jet ink containing a $Na^+$ salt AR52, a cyan ink-jet ink containing a $Na^+$ salt DB199, and a yellow ink-jet ink containing a $Na^+$ salt DY132 are configured for use together as part of a common ink set. Images printed on coated media as described in Example 3 (paper coated with 18-crown-6 derivatized silica) exhibited good permanence after printing a multi-colored image.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A coated media substrate for ink-jet ink printing, comprising:
   (a) a media substrate, having coated thereon,
   (b) a porous coating, said porous coating comprising silica having crown compounds covalently attached thereto through reactive groups.

2. A coated media substrate as in claim 1 wherein the substrate is paper or photographic media.

3. A coated media substrate as in claim 1 wherein the reactive groups are selected from the group consisting of a halo silane and an alkoxy silane.

4. A coated media substrate as in claim 1 wherein each reactive group is attached to the silica by at least two covalent bonds.

5. A coated media substrate as in claim 1 wherein the crown compound is a crown ether.

6. A coated media substrate as in claim 1 wherein the crown compounds are attached to the reactive groups through spacer groups.

7. A coated media substrate as in claim 5 wherein the crown ether comprises the structure:

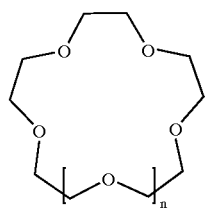

wherein n is from 0 to 6.

8. A coated media substrate as in claim 1 wherein the crown compound comprises the structure:

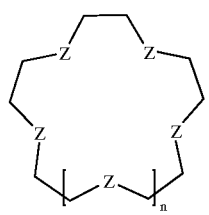

where n is from 0 to 6, and each Z is independently O, S, or N.

9. A coated media substrate as in claim 1 wherein the crown compound is selected from the group consisting of 18-crown-6, dibenzo-18-crown-6, dibenzo-21-crown-7, cyclohexyl-15-crown-5, and benzo-18-crown-6.

10. A coated media substrate as in claim 1 wherein the crown compound is selected from the group consisting of:

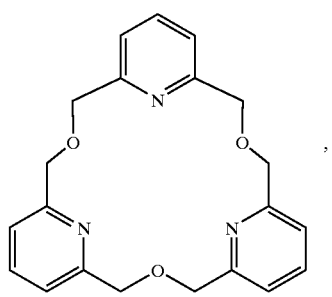

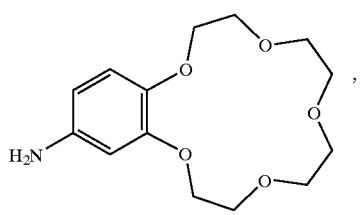

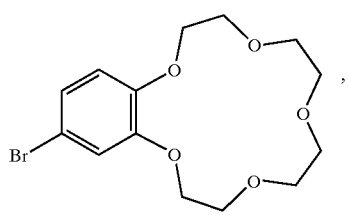

-continued

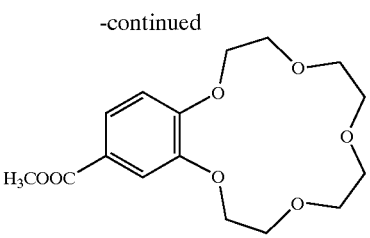

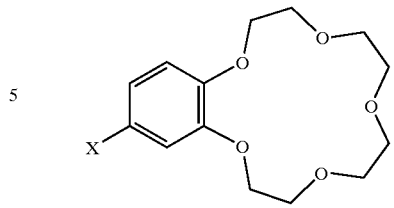

where x is $NH_2$, Br, or $COOCH_3$.

11. A system for producing permanent ink-jet ink images, comprising:
   (a) a substrate, having coated thereon a porous coating, said porous coating comprising silica having crown compounds covalently attached thereto through reactive groups; and
   (b) an ink-jet ink comprising a composition configured for chemically interacting with the crown compounds upon printing the ink-jet ink onto the porous coating.

12. A system as in claim 11 wherein the composition is a dye.

13. A system as in claim 12 wherein the dye comprises anionic dye with positively charged counter ions, and the counter ions are configured for binding with the crown compound.

14. A system as in claim 12 wherein the dye comprises cationic dye with negatively charge counter ions, and the counter ions are configured for binding with the crown compound.

15. A system as in claim 13 wherein the counter ions have an affinity for the crown compounds that is greater than 1 as defined by Log K of the binding constant.

16. A system as in claim 13 wherein the counter ions have an affinity for the crown compound that is greater than 4 as defined by Log K of the binding constant.

17. A system as in claim 13 wherein the counter ions are selected from the group consisting of $Na^+$, $K^+$, $Cs^+$, $(CH_3)_3CNH_3^+$, $Li^+$, $Ni^{2+}$, and combinations thereof, and the crown compounds are selected from the group consisting of 18-crown-6, dibenzo 18-crown-6, dibenzo 21-crown-7, and 15-Crown-5.

18. A system as in claim 13 wherein the counter ion is $(CH_3)_3CNH_3^+$, and the crown compound is as follows:

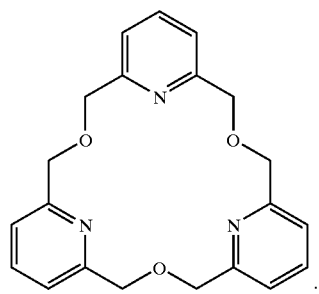

19. A system as in claim 13 wherein the counterion is $Na^+$, and the crown compound is as follows:

20. A system as in claim 11 wherein the substrate is paper or photographic media.

21. A system as in claim 11 wherein the reactive group is selected from the group consisting of a halo silane and an alkoxy silane.

22. A system as in claim 11 wherein the crown compound is a crown ether.

23. A system as in claim 22 wherein the crown ether comprises the structure:

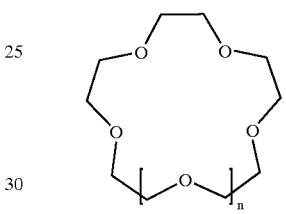

wherein n is from 0 to 6.

24. A system as in claim 11 wherein the crown compound comprises the structure:

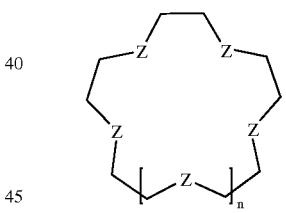

where n is from 0 to 6, and each Z is independently O, S, or N.

25. A system as in claim 11 further comprising multiple ink-jet inks configured for chemically interacting with the crown compounds.

26. A system as in claim 11 further comprising multiple ink-jet inks, wherein a first ink-jet ink comprises a first dye that is configured to preferentially interact with the crown compounds over a second ink-jet ink having a second dye.

* * * * *